Jan. 25, 1927.
H. L. GOODNOW
1,615,621
DANGER SIGNAL
Filed Aug. 19, 1925
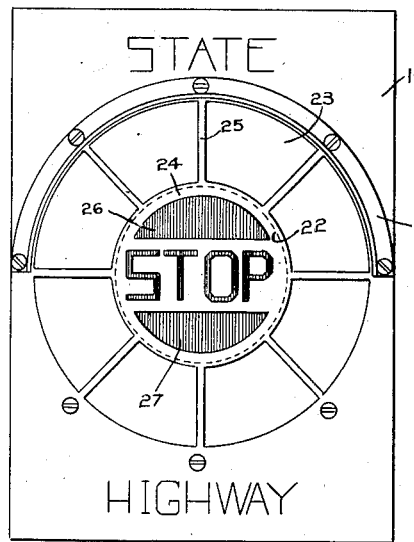
Fig. 2
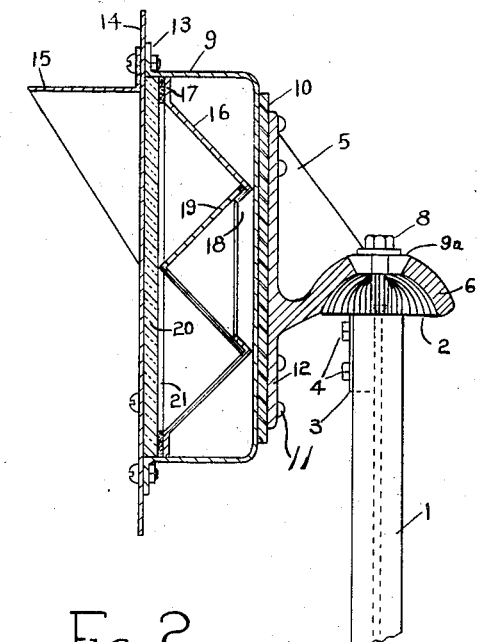
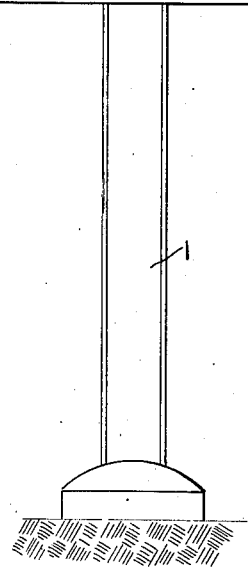
Fig. 1
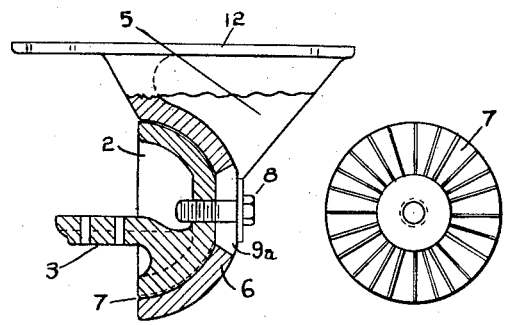
Fig. 3   Fig. 4
INVENTOR
Harry L. Goodnow
BY
ATTORNEY Patented Jan. 25, 1927.

1,615,621

UNITED STATES PATENT OFFICE.

HARRY L. GOODNOW, OF DAVENPORT, IOWA.

DANGER SIGNAL.

Application filed August 19, 1925. Serial No. 51,174.

My invention relates to signaling devices, and is intended to be of particular value to the driving public by locating such device along the roadway or at intersections, cross roads, sharp curves, railroad crossings and other points inherently dangerous to one not otherwise cognizant of their existence. More specifically, however, my invention relates to such signaling devices provided with an adjustment by means of which the device may be set at any desired angle to increase its efficiency by having the rays of light from a passing automobile headlight or the headlight of a locomotive, electric or steam propelled, to strike the signal more direct and reflect said rays of light back through and thereby illuminating the warning element so it can be plainly seen by the operator of an approaching vehicle or carrier of any type whatsoever.

The principal objects of the present invention are as follows:

First: To provide a signal device of a wide range of usefulness and application at a minimum cost of production making such device practical and efficient by incorporating therein reflecting means for rays of light which are intended to enter the device from the headlight of an approaching vehicle or carrier, such rays of light being bent back within the device in such manner as to illuminate the principal element of the device intended to be readable by the approaching operator who is thereby made cognizant of the danger.

Second: To provide a signaling device adaptable to adjustment to meet the varying conditions of the roadway as for example a signal positioned on an incline must have its light receptive means adjusted to the general angle of the incline.

Third: To provide a signaling device adaptable to collecting the light rays on its periphery and a narrow band adjacent to the periphery and reflect such light rays through the center element of the device thereby causing said center element to be illuminated and visible by approaching vehicles.

Fourth: To provide a signaling device which will be sufficiently rugged in construction and durable in materials to withstand the deteriorating influences of the atmospheric conditions.

Fifth: To provide a signaling device which will be sufficiently protected as to eliminate the tendency of rain, snow and sleet to nullify its efficiency as a signal.

Sixth: To provide a signaling device which will be amply protected against destruction from objects thrown against it by passing vehicles or purposely directed toward it by destructive personal intent.

With these objects in view my invention consists in the novel features and advantages of construction and arrangement of parts as will be more fully understood from the following specifications, reference being had to the accompanying drawings, in which:—

Fig. 1 is a front elevation of a signaling device embodying my invention.

Fig. 2 is a side elevation of a signaling device with a portion removed for purpose of illustration.

Fig. 3 is an enlarged detail view of the supporting element partly in section.

Fig. 4 is a plan view of that portion of the supporting element intended to be secured to the post.

It is intended that a practical embodiment of my invention be disclosed in the accompanying drawings, forming a part of this specification in which similar numerals of reference indicate corresponding parts throughout the several views.

The signal device is ordinarily mounted on the post 1 of I beam section which is embedded in a concrete foundation at any desired point along the roadway, at railroad crossings, highway crossings, curves in the road, or other danger points. The casting 2 is provided with a projecting portion 3 which is adapted to be secured to the top of the post by means of the bolt 4. A cast bracket 5 is provided with a cup portion 6 intended to fit around the semi-spherical portion of the casting 2. The outer portion or surface of the semi-spherical head of casting 2 is provided with corrugations 7 as more clearly shown in Fig. 4. The cup portion of casting 5 is provided with corresponding corrugations so that when these two castings are placed together their corrugations match and, provided, the bolt 8 is drawn down clamping the members together, they cannot move relative to each other. Casting 5 is also provided with an elongated slot 9ª through which the bolt 8 passes; such slot being intended to allow certain angular movement between the castings 2 and 5 for the purpose of tilting the signal in the vertical plane or turning same in the horizontal plane. When tilting the casting 5 in the vertical plane in engagement with the casting 2 the narrow portion of a given corrugation of casting 5 will match with the wider portion of the corresponding corrugation of casting 2 on one side of the vertical axis and on the opposite side of the vertical axis the corrugations will lie upon top of each other. However, because the corrugations on one side gear together movement between the elements cannot take place until the bolt 8 is loosened.

The signal is within and on the cylindrical shell 9 provided with the reinforcement 10 across the back portion thereof and to which the casting 5 is secured by the bolts 11 passing thru the flange 12 of the casting 5 and the reinforced back of the signal housing 9.

The cylindrical shell 9 is provided with a flange 13 which extends entirely around it for the purpose of bolting thereto the face plate 14, and protector 15. A reflector plate 16 forming the frustrum of a cone and having its top and bottom edge flanged as indicated by the flanges 17 and 18 thereon is located within the cylindrical shell 9 with its small end bearing against the bottom of said member. Another portion of the reflector plate indicated by the numeral 19 and formed in the shape of a cone is positioned in such manner that its large end includes the flange portion 18 of member 16 and its apex rests against the inner surface of the glass disc 20. A felt ring 21 is clamped between the reflector plate flange 17 and the glass disc 20.

The circular central portion of the glass disc 20 is composed of colored glass, preferably red, and obtained by inserting a red disc of glass in a concentric ring of clear glass or by the more simple way of painting the back of the glass the desired color. The color portion of the glass is equal in diameter to one half the diameter of the glass and is approximately represented by that portion indicated as lying within the dotted circle 22 of Fig. 1. That portion of the glass disc lying without the dotted circle 22 may be left clear or given any color in contrast to the center.

The face plate 14 is preferably rectangular in shape, its shorter dimension being approximately that of the diameter of the shell 9, but its ends projecting beyond sufficiently to receive such lettered signs as may appear advisable to use from time to time. The central portion of the face plate 14 may be cut away, following any desired design, the one shown herewith being a proposed form with regard to the word stamped in the central portion thereof. Openings 23 are cut in the plate 14 leaving a circular disc 24 in the center thereof same being tied to the outer portion of the plate by the strips 25. An opening 26 and 27 is produced within the central portion giving them the form of a segment of a circle. The remaining strip across the horizontal center of the face plate is then designed and cut away to form any desired word.

The immediate effect of thus cutting away certain portions of the face plate is to provide to the sight keystone shaped portions of the clear glass, lying directly behind the plate, through the openings 23 and red portions of the glass through the openings 26, 27 and the small apertures in the central warning word.

The cut away portion of the face plate, and the glass beneath, would collect snow, and other elements having a tendency to fall thereon and thus tend to reduce its effectiveness. In order to protect the signal from such conditions a protector 15 extends over the upper half of the signal.

In operation the rays of light from an approaching vehicle headlight fall upon the clear portions of the glass as seen thru the apertures 23. The glass being clear or of such color as will not exclude the light, these rays fall upon the angular reflector surface 16 being reflected to the reflector surface 19 and thereby reflected against the colored central portion of the glass. This produces illumination making the horizontal word stamped in the face plate visible as well as showing sufficient color around the word and thru the apertures 26 and 27 to enable this portion to indicate danger thru the accepted color signal schemes generally understood.

To adjust the signal to meet varying road level conditions the bolt 8 is loosened and the signal may then be adjusted to the desired angle.

While I have shown and described but a single embodiment of my invention, it is thought that various other structural modifications may be effected within the spirit and scope of the same and I intend that only such limitations be imposed as may be indicated in the appended claims, in which it is my intention to claim all novelty inherent in my invention as broadly as possible in view of the prior art.

What I claim as new and desire to secure by Letters Patent is:

1. In a signal device, a reflector, a transparent plate, a cylindrical cupped member provided with a concentric flange, adapted to receive said reflector and said transparent plate, an apertured plate over said transparent plate, said reflector comprising a truncated cone portion and a concentrically positioned conical portion, said conical portion having its apex in the same plane as the base of the truncated cone portion, said truncated cone portion having its plane of truncation in the same plane as the base of said conical portion, said members being held within said cylindrical cupped member by said transparent plate and said apertured plate, said apertured plate adapted to be secured to the flange of said cylindrical cupped member and a resilient means between said transparent plate, said cupped member and said reflector.

2. In a signal device, a cylindrical cupped member provided with a concentric flange, a transparent plate, an apertured plate adapted to be secured to the concentric flange of the first named member, a truncated conical reflector provided with a right angled flange at its smaller end and an obtuse angled flange at its base, a conical reflector adapted to include within its base said right-angled flange of the first named reflector, said reflectors held together by said transparent member and the apertured plate.

In testimony whereof, I hereunto affix my signature.

HARRY L. GOODNOW.